United States Patent
Johnson et al.

[11] Patent Number: 5,887,438
[45] Date of Patent: Mar. 30, 1999

[54] LOW PROFILE IN LINE CRYOGENIC WATER PUMP

[75] Inventors: Joseph P. Johnson, Stoughton; Stephen R. Matté, Norfolk, both of Mass.; Doug F. Aitken, Bedford, N.H.; Mark Clemons, Westboro, Mass.

[73] Assignee: Helix Technology Corporation, Mansfield, Mass.

[21] Appl. No.: 915,036

[22] Filed: Aug. 20, 1997

[51] Int. Cl.[6] ...................................................... B01D 8/00
[52] U.S. Cl. ............................................ 62/55.5; 417/901
[58] Field of Search ............................... 62/55.5; 417/901

[56] References Cited

U.S. PATENT DOCUMENTS

| | | | |
|---|---|---|---|
| 3,464,223 | 9/1969 | Roberts et al. | 62/55.5 |
| 4,449,373 | 5/1984 | Peterson et al. | 62/55.5 |
| 4,873,833 | 10/1989 | Pfeiffer et al. | 62/55.5 |
| 5,231,839 | 8/1993 | de Rijke et al. | 62/55.5 |
| 5,261,244 | 11/1993 | Lessard et al. | 62/55.5 |
| 5,483,803 | 1/1996 | Matté et al. | 62/55.5 |
| 5,548,964 | 8/1996 | Jinbo | 62/55.5 |

FOREIGN PATENT DOCUMENTS

0610666A1  8/1994  European Pat. Off. .

*Primary Examiner*—Ronald Capossela
*Attorney, Agent, or Firm*—Hamilton, Brook, Smith & Reynolds, P.C.

[57] ABSTRACT

A cold trap includes a fluid conduit having a fluid flow path therethrough, a length along the fluid flow path and a width transverse to the fluid flow path. The width of the fluid conduit is greater than the length. A cryopumping array having an outer rim surrounding a central opening is positioned within the fluid conduit transverse to the fluid flow path such that the fluid flow path extends through the central opening of the array. The outer rim captures water vapor from the fluid flow path. The array has a transverse width and a rim width which are both greater than the thickness of the array. A conductive strut extends from the array through the fluid conduit transverse to the fluid flow path for a conductively coupling the array to a cryogenic cooling source which cools the array to cryogenic temperatures.

15 Claims, 5 Drawing Sheets

LOW PROFILE IN LINE CRYOGENIC WATER PUMP

BACKGROUND

Vacuum pumps such as turbomolecular vacuum pumps are often employed for evacuating process chambers used in manufacturing. Although turbomolecular pumps are efficient in removing many gases from process chambers, they are not efficient for pumping water vapor. As a result, cold traps are commonly mounted in-line between the turbomolecular pump and the process chamber for improving the water pumping capabilities. Such cold traps remove water vapor from the process chamber by condensing the water vapor on a cryopumping array positioned in the fluid flow path.

Most cold traps include a fluid conduit having flanges at opposite ends for mounting between the process chamber and the turbomolecular pump. The cryopumping array is positioned within the fluid conduit and is cooled by a cryogenic refrigerator. Some cold traps such as presented in U.S. Pat. No. 5,483,803 are designed to provide minimal flow resistance for non-condensing gases passing therethrough such as nitrogen and argon by employing a thin walled tubular cryopumping array. The most common tubular array is about 8 inches in diameter by 6 inches long. A tubular array of this size results in a cold trap having a fluid conduit about 9 inches long. The water vapor condenses along the surfaces of the tubular array while allowing the non-condensing gases to pass substantially unrestricted through the open center of the array.

SUMMARY OF THE INVENTION

Occasionally, situations arise where space is limited and there is not enough room for mounting a conventional in-line cold trap between the turbomolecular pump and the process chamber.

The present invention provides a compact cold trap suitable for use in such situations. The cold trap of the present invention includes a fluid conduit having a fluid flow path therethrough. The fluid conduit has a length along the fluid flow path and a width transverse to the fluid flow path, the width of the fluid conduit being greater than its length. A cryopumping array having an outer rim surrounding a central opening is positioned within the fluid conduit transverse to the fluid flow path such that the fluid flow path extends through the central opening of the array. The outer rim captures water vapor from the fluid flow path. The array has a thickness, a transverse width and a rim width. Both the transverse width and the rim width of the array are greater than its thickness.

In preferred embodiments, a conductive strut extends from the array through the fluid conduit transverse to the fluid flow path for conductively coupling the array to a cryogenic cooling source to cool the array to cryogenic temperatures. The cryopumping array is an optically open flat annular member formed from sheet metal. The fluid conduit includes an upstream flange for coupling the cold trap to a process chamber and a downstream flange for coupling the cold trap to a vacuum pump. The vacuum pump is preferably a turbomolecular pump and the cryogenic cooling source is preferably a cryogenic refrigerator.

The present invention cold trap increases the water pumping speed of vacuum pumps such as turbomolecular pumps while only minimally i creasing the length of the fluid flow path and at the same time minimally obstructing the flow of non-condensing gases into the turbomolecular pump. This allows the use of a cold trap in situations where space constraints previously did not allow the use of a cold trap. Prior cold traps have been designed based on the belief that large surface area arrays are required. For example, U.S. Pat. No. 5,483,803 relies on either an extended cylinder within an elongate conduit or a flat sheet which extends beyond the conduit. By contrast, the present invention relies on a flat sheet within the conduit.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
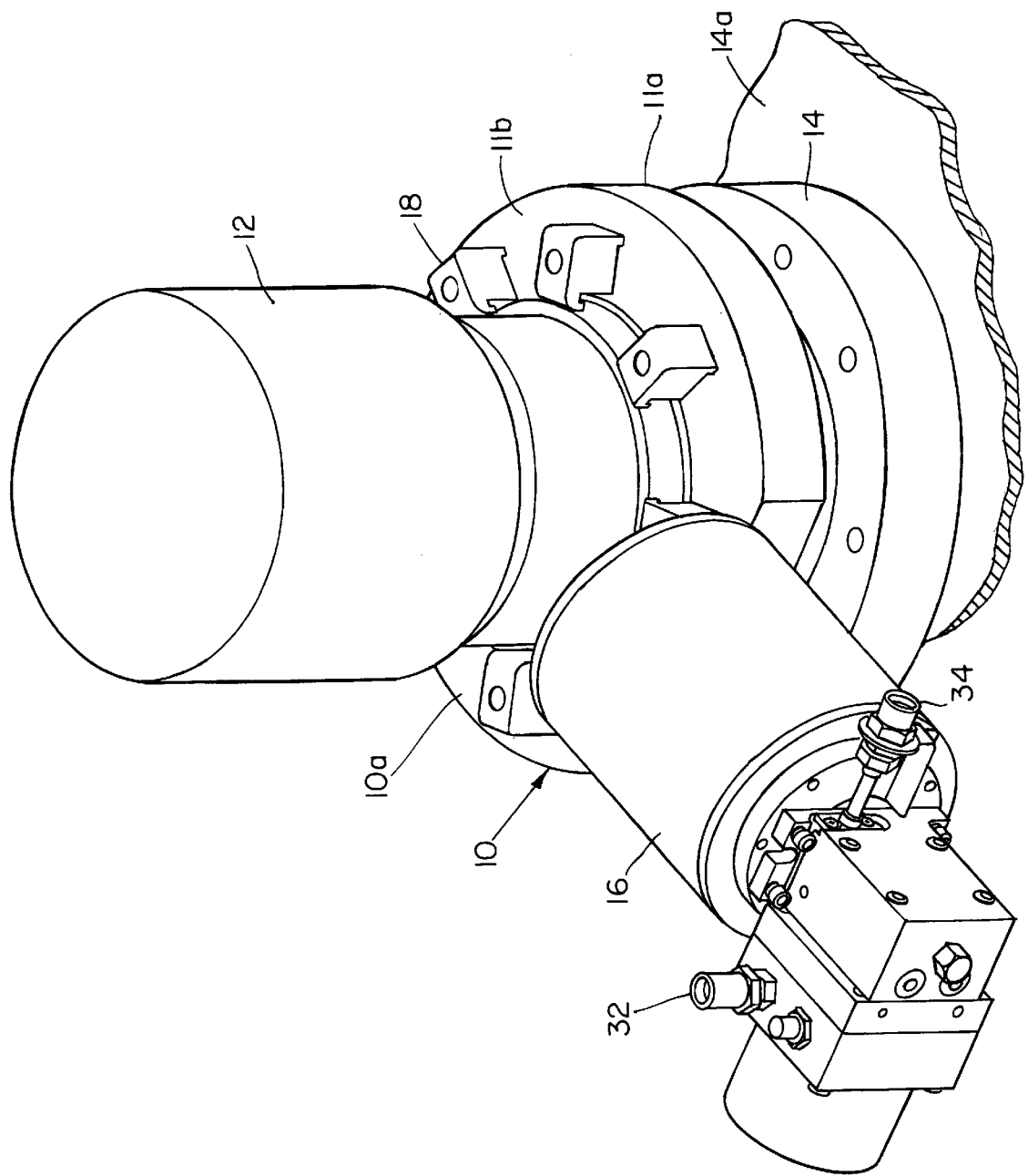
FIG. 1 is a perspective view of the present invention water pump coupled to a vacuum pump and positioned above the flange of a process chamber.
Figure 2:
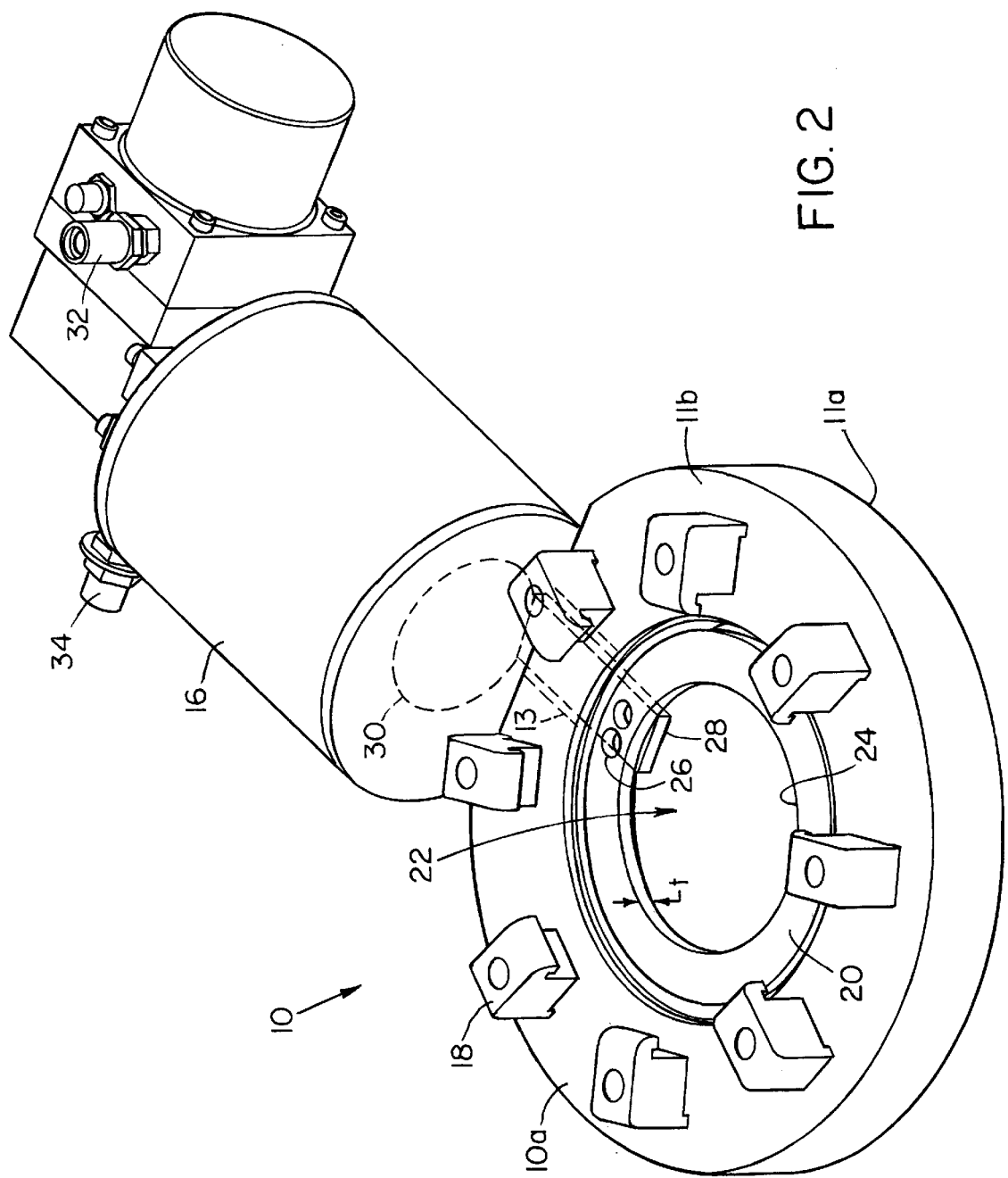
FIG. 2 is an enlarged perspective view of the present invention water pump.
Figure 3:
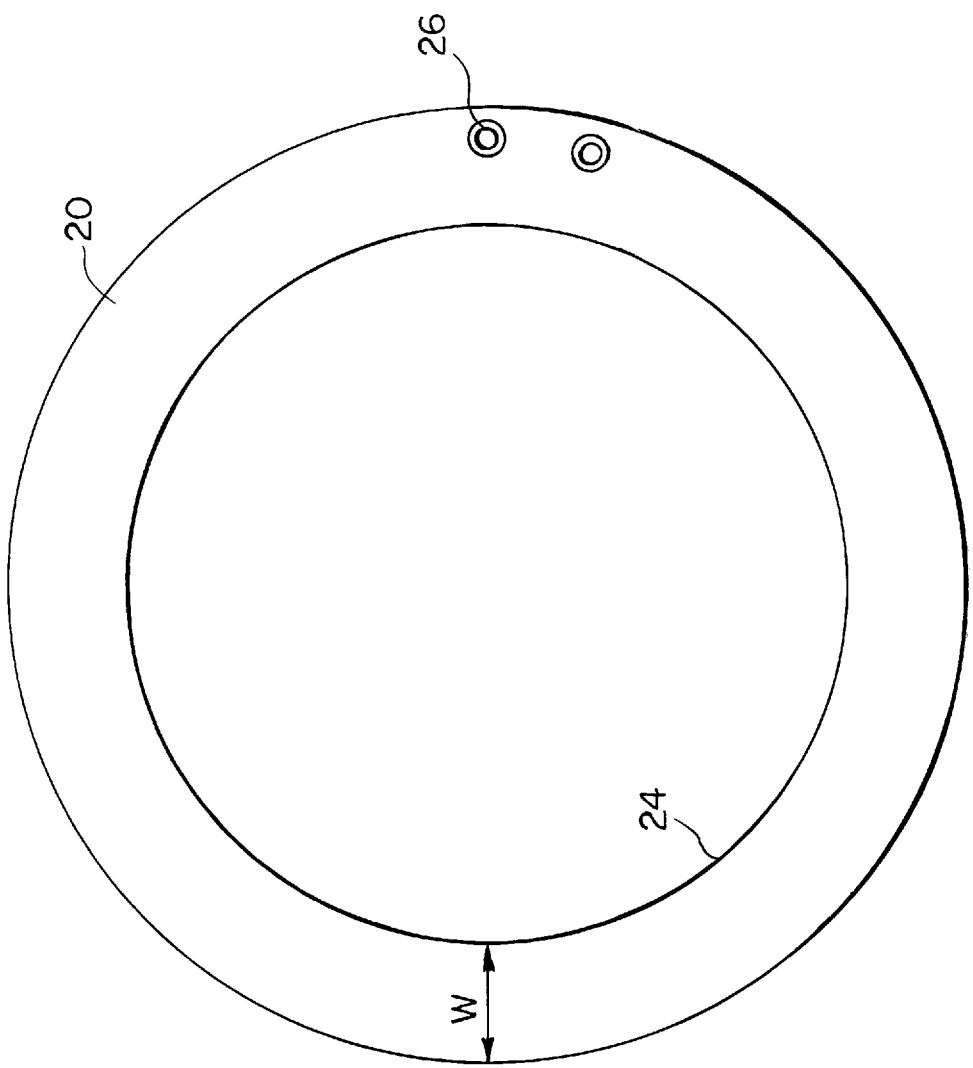
FIG. 3 is a plan view of the preferred cryopumping array employed in the present invention water pump.

Referring to FIGS. 1–3, the cold trap of the present invention is employed as a water pump 10. Water pump 10 has a pump body 10a with an upstream flange 11a and downstream flange 11b. A fluid conduit 22 (FIG. 2) having a fluid flow path extends through pump body 10a. A cryogenic refrigerator 16 is mounted to the side of pump body 10a and extends laterally from pump body 10a. Refrigerator 16 has a cold finger 30 which is conductively coupled to an optically open flat or planar annular cryopumping array 20 for cooling array 20 to cryogenic temperatures. Array 20 is positioned midway within fluid conduit 22 and extends along the perimeter of fluid conduit 22 for condensing water vapor thereon. The plane of array 20 is positioned transversely to the fluid flow path of the fluid conduit 22 such that the fluid flow path extends through opening 24 (FIG. 3) in array 20. Opening 24 is large and centrally located so that array 20 provides little fluid resistance for gases flowing through fluid conduit 22. Pump body 10a is mounted to a turbomolecular vacuum pump 12 by a series of clamps 18 positioned concentrically about fluid flow conduit 22 on downstream flange 11b. The upstream flange 11a of pump body 11a is mounted to the flange 14 of a process chamber 14a. Consequently, there is a direct in-line fluid flow path from the process chamber 14a, through the water pump 10 and into turbomolecular pump 12.

In operation, in order to evacuate process chamber 14a, refrigerator 16 is turned on, cooling array 20 to cryogenic temperatures. Turbomolecular pump 12 is turned on and the rotating turbine blades of turbomolecular pump 12 begin to capture gases from process chamber 14a through water pump 10. The non-condensing gases pass through array 20 while water vapor condenses on the surfaces of array 20. The remaining non-condensing gases such as nitrogen and argon are pumped from the system by turbomolecular pump 12. Periodically, when array 20 is saturated with condensed water vapor, water pump 10 is regenerated to release the water vapor trapped on array 20.

Array 20 operates on the principle that gases passing through fluid conduit 22 and the central opening 24 in array 20 flow in molecular flow. Since gas molecules in molecular flow travel randomly in all directions, water vapor molecules passing through water pump 10 will hit and stick to both the upstream and downstream surfaces of array 20 with about the same probability. Array 20 is capable of trapping about 90% of the water vapor passing through water pump 10. For example, if a 4 inch turbomolecular pump 12 is used without water pump 10, the water pumping speed is only about 250 liters per second at a pressure of about $1 \times 10^{-5}$ torr. The addition of water pump 10, to turbomolecular pump 12 increases the water pumping speed to about 1300 liters per second at a pressure of about $1 \times 10^{-5}$ torr.

A more detailed description of water pump 10 now follows. Refrigerator 16 is preferably a conventional single stage Gifford-MacMahon refrigerator. A displacer is driven within cold finger 30 by a motor driven mechanism for expanding refrigerant therein to cool the cold finger 30. The refrigerant is typically pressurized helium gas. The pressurized refrigerant gas is supplied to refrigerator 16 through inlet 32 and is exhausted through outlet 34.

The cold finger 30 of refrigerator 16 is conductively coupled to a conductive strut 28 which extends from cold finger 30, through an opening 13 in the side of pump body 10a and into fluid conduit 22. The sides of opening 13 are spaced apart from strut 28 to prevent a thermal short. Strut 28 is conductively coupled to array 20 and is secured thereto by bolts through holes 26. Strut 28 is preferably made of conductive sheet metal such as copper and is about 0.25 inches thick. Strut 28 can be bolted directly to cold finger 30 or attached to cold finger 30 with an adapter sleeve.

Array 20 is suspended within fluid conduit 22 by strut 28 so that the plane of array 20 is perpendicular to the fluid flow path of fluid conduit 22. The outer perimeter of array 20 is preferably spaced about 0.125 to 0.25 inches away from the inner surface of fluid conduit 22 to prevent a thermal short with fluid conduit 22. By having a large central opening 24, array 20 is optically open and provides little resistance to gases flowing through array 20 so that the pumping speed of turbomolecular pump 12 is not significantly affected. The opening 24 in array 20 is concentric with the outer diameter of array 20 which provides the outer rim of array 20 with a constant width W (FIG. 3) and maximizes the flow of gases therethrough. For pumping water, refrigerator 16 should cool array 20 to a temperature in the range of 90 k to 130 k with 107 k being the most preferable.

Array 20 is preferably formed from a sheet of conductive metal such as copper and has a thickness t (FIG. 2) between 0.083 inches and 0.25 inches thick. Array 20 is preferably thin because a thin array cools faster than a thicker array and has a higher gas conductance. Although the thickness t of array 20 is preferably 0.25 inches or less, thicknesses t above 0.25 inches can be employed if required to provide the proper temperature gradient. Opening 24 is preferably circular but, alternatively, can be polygonal. In addition, array 20 can have an angled or rippled surface. However, it is most preferably for array 20 to be flat so that the length of fluid conduit 22 through water pump 10 is minimized.

Figure 4:
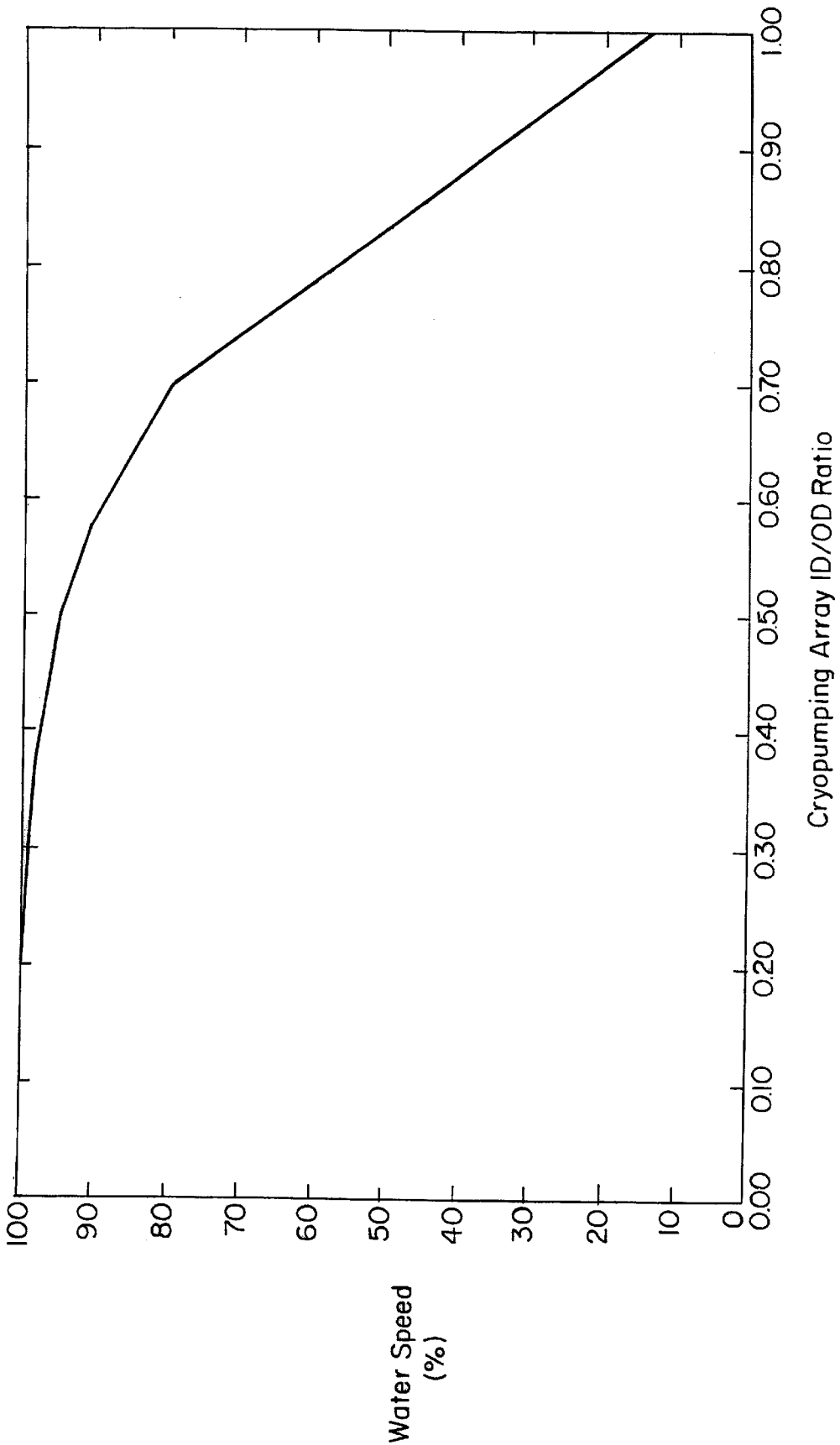
FIG. 4 is a graph depicting the percent water speed of the cryopumping array as a function of the ID/OD ratio.
Figure 5:
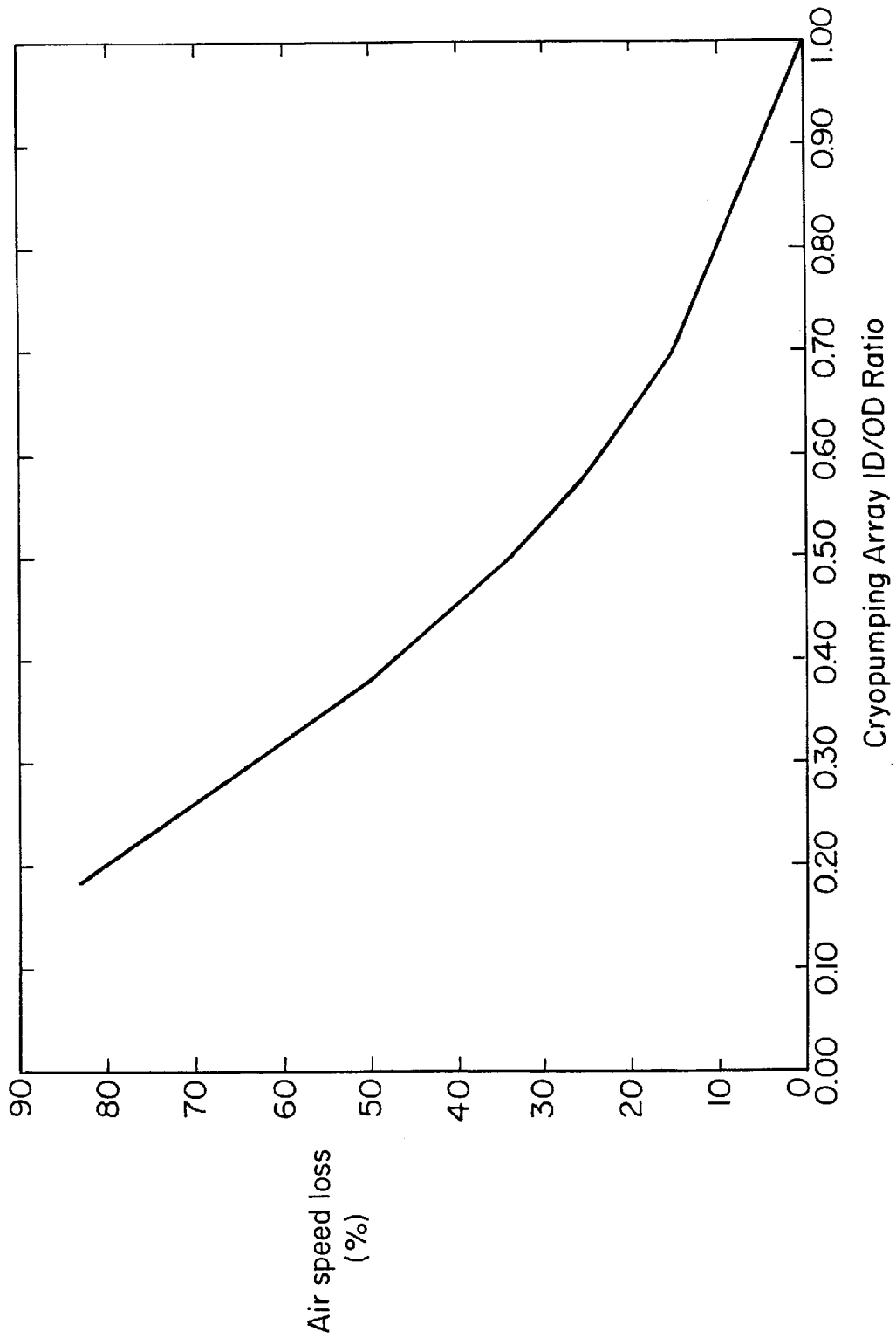
FIG. 5 is a graph depicting the percent air speed reduction of the cryopumping array as a function of the ID/OD ratio.

The outer diameter (transverse width) of array 20 is dependent upon the diameter of fluid conduit 22 and can range from over 10 inches in diameter to only a few inches in diameter. The diameter of the opening 24 in array 20 can be varied to attain either a wide rim width W (FIG. 3) or a narrow rim width W. A wide rim width W results in a high water pumping speed but low gas conductance. In contrast, a narrow rim width W results in a slower water pumping speed but a higher gas conductance. In either case, both the inner diameter and the rim width W are preferably greater in dimension than the thickness t. Array 20 preferably has an inner diameter (ID) to outer diameter (OD) ratio ranging from about 0.6 to 0.8. Referring to FIGS. 4 and 5, it can be seen that this design offers water speeds in the range of 60% to 90% of the maximum possible while only presenting a 10% to 20% loss in air speed. Water vapor is typically difficult to remove from a vacuum system whereas air is removed very quickly. In one example, array 20 has a 7.63 inch outside diameter and a 5.43 inch inside diameter. This results in an ID to OD ratio of 0.7 which captures 80% of the available water vapor and only has a 15% effect on the performance of turbomolecular pump 12.

The compact design of water pump 10 provides water pump 10 with a fluid conduit 22 diameter to length ratio of 8.1. For example, an 8 inch ID diameter fluid conduit 38 has a length along the fluid flow path from the upstream flange 11a to the downstream flange 11b of about 1 inch. Consequently, the water pumping capabilities of the turbomolecular pump 12 can be greatly improved with only a minimal increase in the length of the fluid flow path between process chamber 14a and turbomolecular pump 12.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, the dimensions of water pump 10, array 20 and strut 28 can vary depending upon the application. In addition, if fluid conduit 22 has a non-circular cross-section, the outer perimeter of array 20 can have a contour matching that of the fluid conduit 22. Furthermore, array 20 can be mounted directly to refrigerator 16. Although a turbomolecular pump is preferably used in combination with water pump 10, water pump 10 can be coupled to other types of vacuum pumps such as a diffusion pump. Another embodiment is presented in an application "Water Pump with Integral Gate Valve" filed by S. Matté et al. on even date herewith.

What is claimed is:

1. A cold trap comprising:
    a fluid conduit having a fluid flow path therethrough, a length along the fluid flow path and a width transverse to the fluid flow path, the width of the fluid conduit being greater than the length;
    a cryopumping array having an outer rim surrounding a central opening positioned within the fluid conduit transverse to the fluid flow path such that the fluid flow path extends through said central opening, said outer rim for capturing water vapor from the fluid flow path, the array having a thickness, a transverse width and a rim width, both the transverse width and the rim width being greater than the thickness.

2. The cold trap of claim 1 further comprising a conductive strut extending from the array through the fluid conduit transverse to the fluid flow path for conductively coupling the array to a cryogenic cooling source to cool the array to cryogenic temperatures.

3. The cold trap of claim 2 in which the fluid conduit further comprises an upstream flange for coupling the cold trap to a process chamber.

4. The cold trap of claim 3 in which the fluid conduit further comprises a downstream flange for coupling the cold trap to a vacuum pump.

5. The cold trap of claim 4 in which the vacuum pump is a turbomolecular pump.

6. The cold trap of claim 2 in which the cryogenic cooling source is a cryogenic refrigerator.

7. The cold trap of claim 1 in which the array is a flat annular member formed from sheet metal.

8. The cold trap of claim 1 in which the array is optically open.

9. A cold trap comprising:
   a fluid conduit having a fluid flow path therethrough, a length along the fluid flow path and a width transverse to the fluid flow path, the width of the pump body being greater than the length, the fluid conduit also having an upstream flange extending from the pump body for coupling the cold trap to a process chamber and a downstream flange for coupling the cold trap to a vacuum pump;
   a cryopumping array comprising a flat annular member having an outer rim surrounding a central opening positioned within the fluid conduit transverse to the fluid flow path such that the fluid flow path extends through said central opening, said outer rim for capturing water vapor from the fluid flow path, the array having a thickness, a transverse width and a rim width, both the transverse width and the rim width being greater than the thickness; and
   a conductive strut extending from the array through the fluid conduit transverse to the fluid flow path for conductively coupling the array to a cryogenic refrigerator to cool the array to cryogenic temperatures.

10. The cold trap of claim 9 in which the vacuum pump is a turbomolecular pump.

11. The cold trap of claim 9 in which the array is optically open.

12. A method of capturing water vapor with a cold trap, the cold trap including a fluid conduit having a fluid flow path therethrough, a length along the fluid flow path and a width transverse to the fluid flow path, the width of the fluid conduit being greater than the length, the method comprising the steps of:
   positioning a cryopumping array having an outer rim surrounding a central opening within the fluid conduit transverse to the fluid flow path such that the fluid flow path extends through said central opening, the array having a thickness, a transverse width and a rim width, both the transverse width and the rim width being greater than the thickness; and
   capturing water vapor from the fluid flow path on the outer rim of the array.

13. The method of claim 12 further comprising the step of cooling the array to cryogenic temperatures by conductively coupling the array to a cryogenic cooling source with a conductive strut extending from the array through the fluid conduit transverse to the fluid flow path.

14. The method of claim 12 further comprising the step of coupling the cold trap to a process chamber.

15. The method of claim 14 further comprising the steps of:
   coupling a vacuum pump to the cold trap; and
   pumping gases from the process chamber with the vacuum pump, the gases flowing through the fluid flow path.

* * * * *